United States Patent
Takeuchi et al.

(10) Patent No.: US 10,104,016 B2
(45) Date of Patent: Oct. 16, 2018

(54) COMMUNICATION DEVICE, COMMUNICATION DEVICE SYSTEM, AND COMMUNICATION METHOD

(71) Applicant: HITACHI, LTD., Tokyo (JP)

(72) Inventors: Takashi Takeuchi, Tokyo (JP); Masayuki Miyazaki, Tokyo (JP); Ryosuke Fujiwara, Tokyo (JP)

(73) Assignee: HITACHI, LTD., Tokyo (JP)

(*) Notice: Subject to any disclaimer, the term of this patent is extended or adjusted under 35 U.S.C. 154(b) by 2 days.

(21) Appl. No.: 15/518,832

(22) PCT Filed: Dec. 12, 2014

(86) PCT No.: PCT/JP2014/082913
§ 371 (c)(1),
(2) Date: Apr. 13, 2017

(87) PCT Pub. No.: WO2016/092686
PCT Pub. Date: Jun. 16, 2016

(65) Prior Publication Data
US 2017/0230310 A1 Aug. 10, 2017

(51) Int. Cl.
*H04L 12/939* (2013.01)
*H04L 1/00* (2006.01)
(Continued)

(52) U.S. Cl.
CPC ............ *H04L 49/557* (2013.01); *G06F 11/14* (2013.01); *H04L 1/0042* (2013.01);
(Continued)

(58) Field of Classification Search
CPC ... H04L 1/0067; H04L 1/0083; H04L 1/0042; H04L 1/0081; G06F 11/14
See application file for complete search history.

(56) References Cited

U.S. PATENT DOCUMENTS

2004/0095950 A1  5/2004  Shirogane et al.
2006/0050742 A1  3/2006  Grandhi et al.
(Continued)

FOREIGN PATENT DOCUMENTS

JP   05-308330 A    11/1993
JP   2004-289621 A  10/2004
(Continued)

OTHER PUBLICATIONS

Japanese Office Action dated Mar. 20, 2018 for the Japanese Patent Application No. 2016-563369.

*Primary Examiner* — Asad Nawaz
*Assistant Examiner* — Syed S Ali
(74) *Attorney, Agent, or Firm* — Volpe and Koenig, P.C.

(57) ABSTRACT

Provided are a device, a system, and a method in which redundancy is changed in accordance with a line state, and thus the optimal redundancy can be set while the current settings are compared to the previous settings. A communication device measures line quality information from a received packet, and generates a redundancy change instruction based on information regarding a line. In a case where the communication device acquires line quality information for the second and subsequent times, the communication device compares the previous redundancy change instruction and the previous line quality information, to the current line quality information, and sets redundancy. Thus, it is possible to suppress the occurrence of congestion and satisfy a target value of the line quality, and to search for a condition which causes the redundancy to be the minimum.

6 Claims, 9 Drawing Sheets

(51) Int. Cl.
*G06F 11/14* (2006.01)
*H04L 12/40* (2006.01)

(52) U.S. Cl.
CPC .......... *H04L 1/0067* (2013.01); *H04L 1/0081* (2013.01); *H04L 1/0083* (2013.01); *H04L 1/0061* (2013.01); *H04L 12/40071* (2013.01)

(56) References Cited

U.S. PATENT DOCUMENTS

| | | | |
|---|---|---|---|
| 2006/0280205 A1 | 12/2006 | Cho | |
| 2008/0134005 A1 | 6/2008 | Izzat et al. | |
| 2009/0046580 A1 | 2/2009 | Botzko et al. | |
| 2010/0202309 A1 | 8/2010 | Suneya | |
| 2010/0250768 A1* | 9/2010 | Barreto | H04L 49/90 709/231 |
| 2011/0099437 A1* | 4/2011 | Ramakrishnan | H04L 1/0007 714/704 |
| 2011/0219287 A1* | 9/2011 | Srinivas | G06F 11/10 714/781 |
| 2014/0325087 A1* | 10/2014 | Barreto | H04L 49/90 709/231 |
| 2015/0009999 A1* | 1/2015 | Oguchi | H04L 69/169 370/392 |
| 2015/0095739 A1* | 4/2015 | Zhovnirnovsky | H03M 13/616 714/759 |
| 2015/0100858 A1* | 4/2015 | Zhovnirnovsky | H03M 13/616 714/776 |
| 2015/0349930 A1* | 12/2015 | Sazawa | H04L 43/0864 370/254 |

FOREIGN PATENT DOCUMENTS

| | | |
|---|---|---|
| JP | 2005-184662 A | 7/2005 |
| JP | 2006-109325 A | 4/2006 |
| JP | 2006-345523 A | 12/2006 |
| JP | 2008-510380 A | 4/2008 |
| JP | 2008-522545 A | 6/2008 |
| JP | 2009-027720 A | 2/2009 |
| JP | 2010-183439 A | 8/2010 |
| JP | 2013-225761 A | 10/2013 |

\* cited by examiner

COMMUNICATION DEVICE, COMMUNICATION DEVICE SYSTEM, AND COMMUNICATION METHOD

TECHNICAL FIELD

The present invention relates to a communication device, a communication device system, and a communication method, and particularly to a communication device, a communication device system, and a communication method which can be applied to telemedicine, a remote monitoring control system, and the like.

BACKGROUND ART

Recently, for a work under a severe environment in which an access of a person is difficult, a need for a remote monitoring control system which acquires image information or sound information of a remote place, so as to control devices in the field is increased. At this time, for example, it is considered that a wide area network (WAN) such as the Internet, which has been developed as a communication infrastructure is used for a communication with a medium in a remote place.

Currently, the Transmission Control Protocol (TCP) and the User Datagram Protocol (UDP) are used as the main communication protocols used for communication through the WAN. The TCP guarantees an order of a data sequence and retransmits missed data, and thus realizes communication having high reliability, when data is transmitted from a certain terminal to another terminal. The UDP which is a communication protocol focusing on low delay of communication in comparison to the reliability is used in an application which does not need a service having high reliability. In the UDP, retransmission is not performed, and the order of a data sequence is not guaranteed. However, the UDP allows transmission having low delay at a high speed.

The Real-time Transport Protocol (RTP) is provided as a protocol for distributing stream data of an image, sound, and the like in real time. In a scheme in which the RTP is standardized as a protocol for transmitting a real-time stream, time information is added to packet data to be transmitted, and thus a time relationship between pieces of data on a reception terminal side can be understood. Data of an image or sound can be reproduced even though a portion of the data is lost. Thus, on the reception side, a lost packet or a packet of which arrival is delayed can be ignored, and data can be reproduced by using only packets which have been arrived at a time expected by the reception side. The RTP can be combined with any of the TCP and the UDP. However, because guarantee of an order of a data sequence is performed by retransmission in the TCP, combination of the RTP with the UDP is used in most cases.

However, there are problems in that avoiding loss of a data packet (packet loss), which occurs when the packet passes via a network is not possible in only the RTP, and particularly, reproducing high-quality stream data is not possible under an environment in which communication quality of a line is relatively bad.

As a technique for improving reliability of data transmission, a method in which a forward error correction (FEC) code is assigned to data to be sent, and the data having the assigned FEC code is transmitted is proposed. The FEC code is assigned and is transmitted, and thus a lost data packet can be restored independently on the reception side. Accordingly, it is possible to realize communication having high reliability with low delay, even in a case where communication quality of a line is relatively bad. In the FEC method in packet transmission, the error correction code is computed in a unit of plural pieces of packets. A parity code, the Reed-Solomon code, and the like are used as the FEC code.

Generally, the FEC packet is transmitted with data, as an Internet Protocol (IP) packet. In the general wide area network such as the Internet, in addition to a packet transmitted by a terminal, a packet of another terminal is transmitted on the same channel. Thus, when a ratio of the total quantity of data and a FEC packet to the total quantity of a data packet is set as redundancy, if the redundancy is set to be too high in an environment in which the maximum transmission rate is limited, the total quantity of data exceeds capacity of a channel, and thus congestion occurs. In a case where the congestion occurs, burst loss in which packets are continuously missed may occur. In a case where data is restored by FEC even though the congestion occurs, it is not possible that a terminal at the end detects an occurrence of the congestion. Thus, it is not possible that the terminal performs adequate measures.

CITATION LIST

Patent Literature

PTL 1: JP-A-2013-225761

SUMMARY OF INVENTION

Technical Problem

PTL 1 discloses a method in which, in a case where a packet arrival interval in a network communication fluctuates largely, the number of pieces obtained by dividing a packet is increased so as to reduce a packet size, and an error correction code is added so as to reduce fluctuation in the network and to reduce a loss rate.

Generally, when congestion occurs in a network, the degree of fluctuation of a packet arrival interval is also increased, and a packet loss rate is also increased. At this time, if the number of pieces obtained by dividing a packet is increased so as to increase redundancy, the occurrence of congestion is promoted. As a result of the promotion, the fluctuation or the loss rate is more increased. Thus, it is difficult to set appropriate redundancy when the congestion occurs. This gets to be a problem.

Solution to Problem

According to a first aspect of the present invention, there is provided a communication system or a communication device. Communication devices are respectively provided at two points and communicate with each other. The communication device or the communication system includes a packet reception unit configured to receive a packet from a WAN side and output the received packet to a local area network (LAN) side, and a packet transmission unit configured to take a packet from the LAN side and transmit the taken packet to the WAN side.

The packet reception unit includes a reception packet type determination unit that determines whether or not the received packet is a packet coded with a predetermined error correction code (FEC), based on header information of the received packet, an FEC decoding unit that restores loss of a data packet from the data packet and an FEC packet, in a case where the received packet is a packet coded with the predetermined FEC, a line quality measurement unit that computes line quality information such as the number of burst losses, the frequency of an occurrence of the burst loss, a packet loss rate, and the like from a loss status of the received packet, a feedback data generation unit that generates feedback data based on line quality information which has been measured by the line quality information measurement unit, a reception-side FEC header processing unit that operates header information of a packet sent from the FEC decoding unit, a feedback data extraction unit that extracts feedback data from the header information acquired in the reception-side header processing unit, and a reception packet output unit that outputs a decoded packet to the LAN side.

The packet transmission unit includes a transmission packet type determination unit that determines whether or not a data packet is a target of FEC coding, based on header information of the data packet input from the LAN side, an FEC coding unit that controls the amount of an FEC packet, based on a coding parameter from the feedback data extraction unit in the packet reception unit, in a case where data input from the LAN side is a target packet of the FEC coding, a transmission-side FEC header processing unit that stores a parameter from the feedback data generation unit in the packet reception unit, in an FEC header, along with the coding parameter such as redundancy, and a packet transmission unit that transmits a coded packet to the WAN side.

The feedback data generation unit in the packet reception unit generates new feedback data at a time point t2, based on line quality information which has been measured at a time point t1 in the line quality measurement unit, line quality information measured at the time point t2 (the time point t2 is a time point after the time point t1), and feedback data generated at the time point t1.

Advantageous Effects of Invention

According to the present invention, it is possible to suppress an occurrence of congestion and achieve a desired packet loss rate at the smallest redundancy, in a line having a probability of packet loss occurring by the congestion.

DESCRIPTION OF EMBODIMENTS

[Outline]

Figure 1:
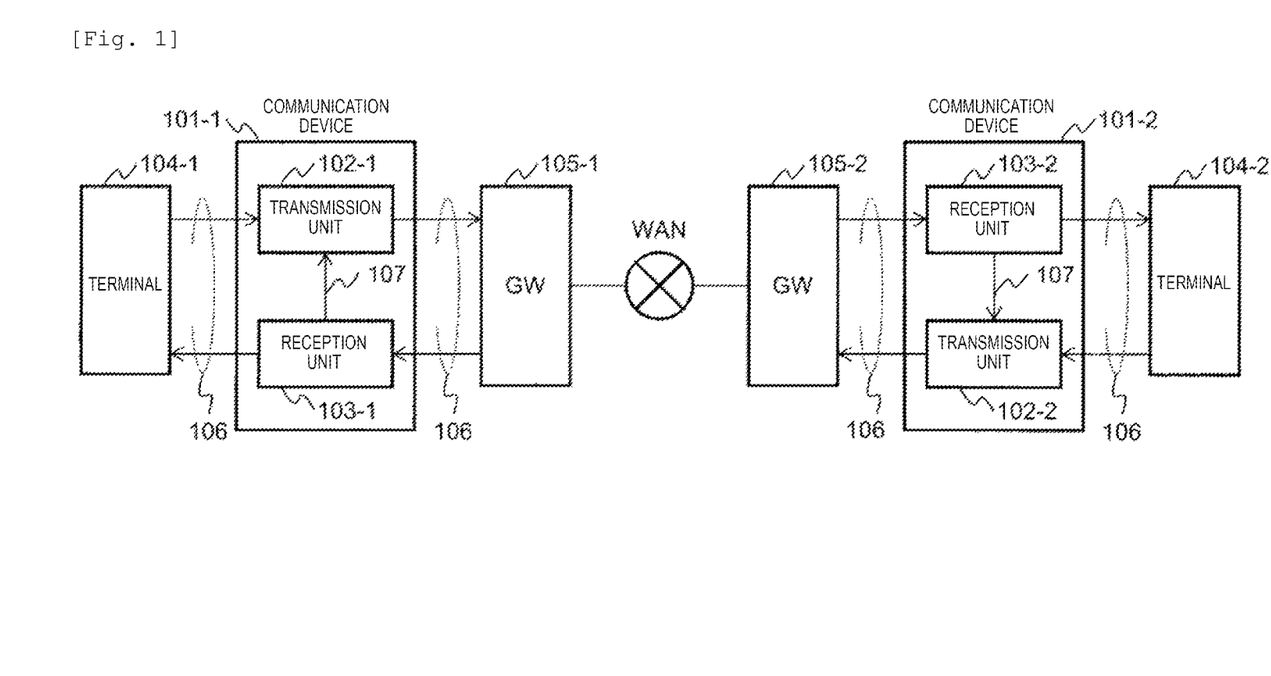
FIG. 1 is a diagram illustrating a configuration of a communication system according to a first embodiment of the present invention.

FIG. 1 is a diagram illustrating a configuration of a communication system according to a first embodiment of the present invention. For example, in a communication network through a WAN, such as the Internet or a portable telecommunication network, packet loss or changing an order of packets often occurs, and a situation referred to as burst loss, in which a plurality of packets is continuously lost occurs. A communication device according to the embodiment is an example suitable for effectively suppressing loss of a packet.

The communication device is a device which is disposed on each of a transmission side and a reception side, and performs bidirectional communication. The communication device has a transmission unit and a reception unit, and is implemented in a form of software or hardware having a function of restoring a lost packet by forward error correction (FEC) coding and decoding.

The reception unit in the communication device includes a reception packet type determination unit that determines whether or not a packet is a packet which requires FEC decoding, based on header information of the received packet. When FEC coding is performed, an operation of embedding an individual FEC header in a packet is performed on the packet having a specific destination IP address and a specific port number. Thus, on the reception side, it can be determined whether or not the packet is a packet which requires decoding, based on the above pieces of information. Regarding a general packet which is determined that FEC decoding processing is not required, the packet itself is output without decoding processing. A packet determined to require FEC decoding processing is transferred to an FEC decoding unit.

The FEC decoding unit performs decoding based on a coding parameter which is included in an FEC header, and restores loss of a packet. At this time, a line quality measurement unit examines a situation of a lost packet, and examines an extent of packet loss occurring in a communication line. At this time, for example, information such as the number of burst losses, the frequency of the burst loss occurring, a packet loss rate, and a change of an order of packets can be also acquired. The pieces of line quality information are sent to a feedback data generation unit. A reception-side FEC header processing unit removes an unnecessary header portion from the restored data, and delivers a data portion to a reception packet output unit and delivers an FEC header portion to a feedback data extraction unit. The feedback data extraction unit extracts feedback data described in the header information, and delivers the extracted feedback data to the transmission unit. The reception packet output unit outputs the received data as a reception packet. The feedback data generation unit generates feedback data based on line quality information which has been acquired from a line quality information unit, and information of an error correction code amount, which has been obtained from the feedback data extraction unit. The feedback data generation unit delivers the generated feedback data to the transmission unit.

The transmission unit in the communication device includes a transmission packet type determination unit that determines communication with a specific communication counterpart or communication from a specific application. The transmission unit transmits a packet itself, for which it is determined that FEC coding is not required, to the WAN side. The transmission unit transmits data to an FEC coding unit in a case where it is determined that FEC coding is required. Determination of whether or not error correction is required may be performed based on information such as a destination IP address and a port number.

Regarding a packet for which it is determined that FEC coding is required, the FEC coding unit updates the coding parameter based on feedback data which has been obtained from the feedback data extraction unit in the reception unit, and the FEC coding unit performs FEC coding processing. A data packet and an FEC packet corresponding to the data packet are generated by the coding processing, and the generated packets are delivered to a transmission-side header processing unit. In the transmission-side header processing unit, information from the feedback data generation unit in the reception unit is embedded in a header along with the coding parameter which is used when coding is performed by the FEC coding unit. Then, the packet is sent to a packet transmission unit, and is output from the packet transmission unit to the WAN side.

Example 1

[Overall Configuration]

An example illustrated in FIG. 1 shows a configuration when terminals 104-1 and 104-2 communicate with each other. A communication device 101 is connected between the terminal 104 and a gateway (GW) 105. The devices are connected to each other by a communication line (including a wireless communication line) 106 such as Ethernet (registered trademark). The communication line 106 may be wired or wireless. The communication device 101 includes a transmission unit 102 and a reception unit 103. For example, the communication device 101 may be configured by a personal computer (PC). The terminal 104 may be a device such as a PC. The system may be applied in order to control plural pieces of equipment connected to the terminal 104.

When a data packet is transmitted from the terminal 104-1, the communication device 101-1 receives the data packet and inputs the received data packet to the transmission unit 102-1. The transmission unit 102-1 performs coding processing such as FEC calculation, and outputs a packet subjected to coding processing, to the GW 105-1 side. The GW 105-1 receives a data packet from the communication device 101-1, and transmits the received packet to the GW 105-2 through the WAN. The GW 105-2 receives data from the WAN side, and transmits a data packet to the communication device 101-2. The communication device 101-2 receives the data from the GW 105-2, and inputs a packet to the reception unit 103-2. The reception unit 103-2 decodes the coded packet. After error correction is performed, the reception unit 103-2 transmits a data packet to a communication terminal 104-2. In a case where a header of the received packet includes feedback information, the reception unit 103-2 has a path 107 for delivering the feedback information to the transmission unit 102-2.

In a case where the terminal 104-2 transmits a packet to the terminal 104-1, similar processing is also performed. In this manner, in the communication device 101, the transmission unit 102 performs coding processing of a packet on a packet input from the terminal 104 side, and the reception unit 103 performs decoding processing on a packet received from the GW 105 side. With this configuration, the communication device 101 may be provided as a bridge, on a path on which, generally, the terminal 104 and the GW 105 are directly connected, and it is possible to perform FEC calculation processing on a data packet without making changes to the existing communication system. A network router or a network hub may be connected between the GW 105 and the communication device 101 or between the communication device 101 and the terminal 104.

[Communication Device 101]

Figure 2:
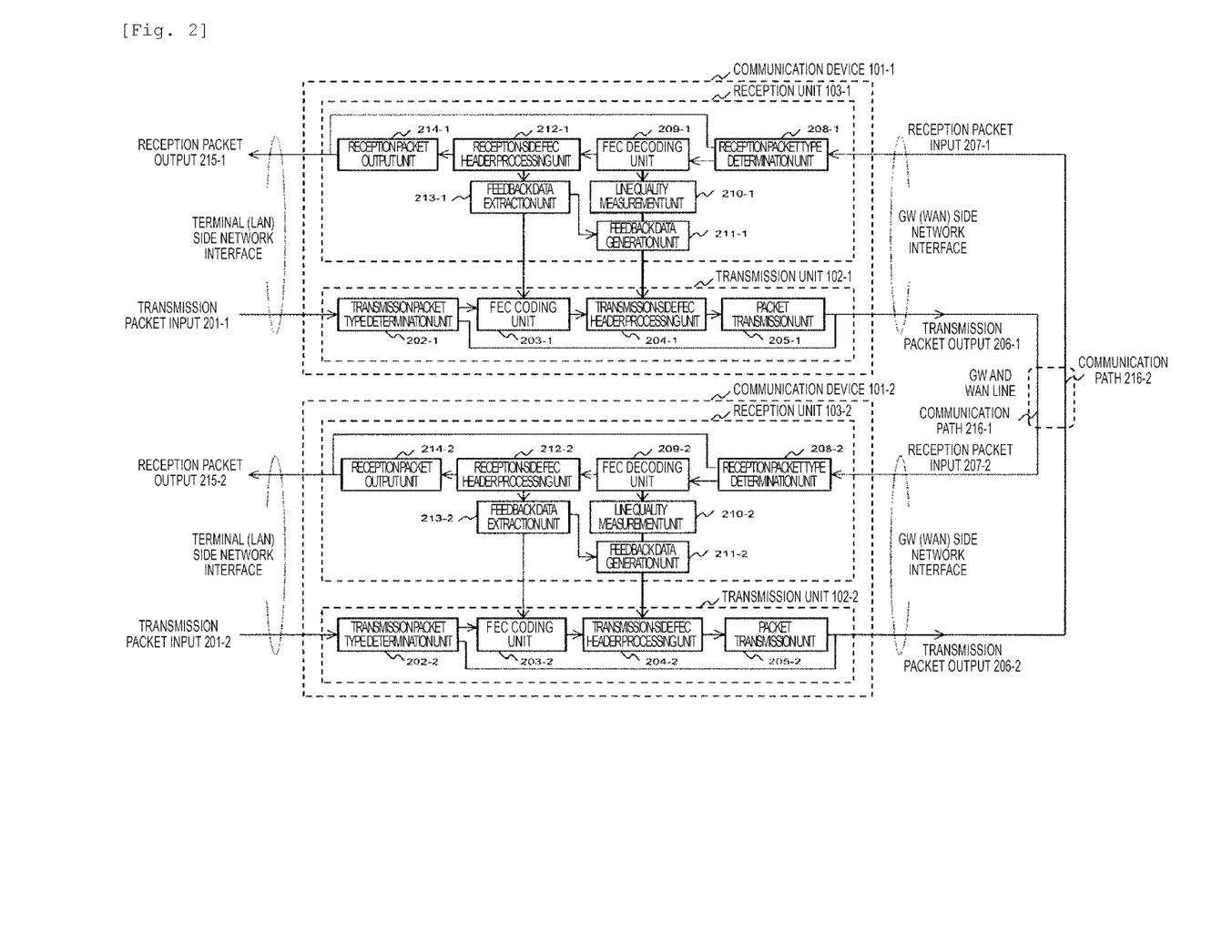
FIG. 2 is a diagram illustrating a configuration of a communication device according to the first embodiment of the present invention.

FIG. 2 illustrates a configuration diagram of the communication device 101. The communication device 101-1 is disposed so as to form a pair with the communication device 101-2. Each of the communication devices 101 includes the transmission unit 102 and the reception unit 103. Transmission packet input 201-1 which has been input from the terminal side (LAN side) is input to the transmission unit 102-1, and is sent to a transmission packet type determination unit 202-1. The transmission packet type determination unit 202-1 determines whether or not communication with a specific communication counterpart which has been preset, or communication from a specific application is performed. At this time, the transmission packet type determination unit 202-1 may compare header information such as an IP address, a port number, and a communication protocol, which is described in a header of the transmission packet input 201-1, to preset pieces of information, and thus may determine whether or not a packet is a target to which FEC is to be assigned. A packet determined to be a target of FEC is transmitted to an FEC coding unit 203-1. A packet determined to be a packet other than the target is transmitted to transmission packet output 206-1. Regarding the IP address, the port number, or the communication protocol which corresponds to a determination condition of the transmission packet type determination unit 202-1, plural types of combinations may be set in advance. For example, in a case where determination of whether or not the packet is a packet for which FEC is to be calculated is performed in accordance with settings of an IP address and a port number, the communication protocol may be a target of FEC coding, regardless of the TCP, the UDP, the RTP, and the like.

The FEC coding unit 203-1 performs FEC coding based on feedback data from the communication device 101-2, which has been acquired by the feedback data extraction unit 210-1 in the reception unit 103-1. For example, in a case where a feedback data acquisition unit 210-1 does not hold line quality information or in a case where the line quality information is old, FEC coding may be performed in accordance with a preset value. Details of the coding processing in the FEC coding unit 203-1 will be described later.

A data packet input to the FEC coding unit 203-1 and a new FEC packet which is calculated by the FEC coding unit 203-1 are sent to a transmission-side FEC header processing unit 204-1. In the transmission-side FEC header processing unit 204-1, an FEC header in which a coding parameter when coding is performed by the FEC coding unit is written is assigned to each of the packets, and the packets are transmitted to a packet transmission unit 205-1. At this time, the transmission-side FEC header processing unit 204-1 stores line quality information of a communication path 216-2, which is generated by the feedback data generation unit 213-1 in the reception unit 103-1, in an FEC header, as feedback information for the communication device 101-2. The packet transmission unit 205-1 receives data from the transmission-side FEC header processing unit 204-1, and transmits data to the WAN side, as the transmission packet output 206-1.

If the communication device 101-2 receives reception packet input 207-2 from the GW side (WAN side), the communication device 101-2 transmits a packet to a reception packet type determination unit 208-2. The reception packet type determination unit 208-2 reads information of the reception packet input 207-2, such as an IP header, the TCP, an UDP header, and an FEC header, so as to determine whether or not the received packet is a packet which requires FEC decoding processing. A packet for which it is determined that FEC decoding processing is not required is output as reception packet output 215-2. A packet for which it is determined that decoding processing is required is sent to an FEC decoding unit 209-2. The FEC decoding unit 209-2 performs decoding processing of the packet based on information of the FEC header. At this time, a line quality measurement unit 210-2 measures line quality information, for example, the number of burst losses, the frequency of an occurrence of the burst loss, a packet loss rate, and the like, from an occurrence situation of packet loss. The feedback data generation unit 211 delivers the received data to the transmission-side FEC header processing unit 204-2 in the transmission unit 102-2, as line quality information of a communication line 216-1. A packet which has been subjected to correction processing of packet loss by the FEC decoding unit 209-2 is sent to the reception-side FEC header processing unit 209-2, and header processing corresponding to IP masquerading or port forwarding is performed. The feedback data extraction unit 213 acquires feedback data included in the FEC header, and delivers the acquired feedback data to the FEC coding unit 203-2 in the transmission unit 102-2. A data packet of which decoding processing is completed by the reception-side FEC header processing unit 209-2 is output as the reception packet output 215-2, from a reception packet output unit 214-2. Regarding communication from the communication device 101-2 to the communication device 101-1, similar processing is performed in the reception unit 102-1 in the communication device 101-1.

As an error correction code used in the device or the system, a certain error correction code such as a parity code or the Reed-Solomon code, which enables redundancy to be changed may be used. The redundancy referred here indicates a ratio of the sum of the number of an FEC packet and data packets to the number of data packets input from the transmission packet input 201.

[FEC Coding Unit 203]

The FEC coding unit 203 generates an FEC packet from the input data packet, and outputs the data packet and the generated FEC packet. When a ratio of the amount of the current error correction code packet to the amount of an input packet is set as k, it is assumed that k is allowed to be changed in a range of m to n (k, m, and n are real numbers of 0 or more, and m≤n).

At this time, if feedback data output from the feedback data extraction unit 210 is an instruction to increase k, the coding parameter is changed so as to increase the ratio of an FEC packet to an input data packet. If the feedback data extracted by the feedback data extraction unit 210 is an instruction to decrease k, the coding parameter is changed so as to decrease the ratio of an FEC packet to an input data packet. In a case where the feedback data extraction unit does not have feedback data, the coding parameter is not changed. The FEC coding unit 202 generates an FEC packet based on the coding parameter, and transmits the data packet and the generated FEC packet to the transmission-side FEC header processing unit 204.

[Transmission-Side FEC Header Processing Unit 204]

Figure 3:
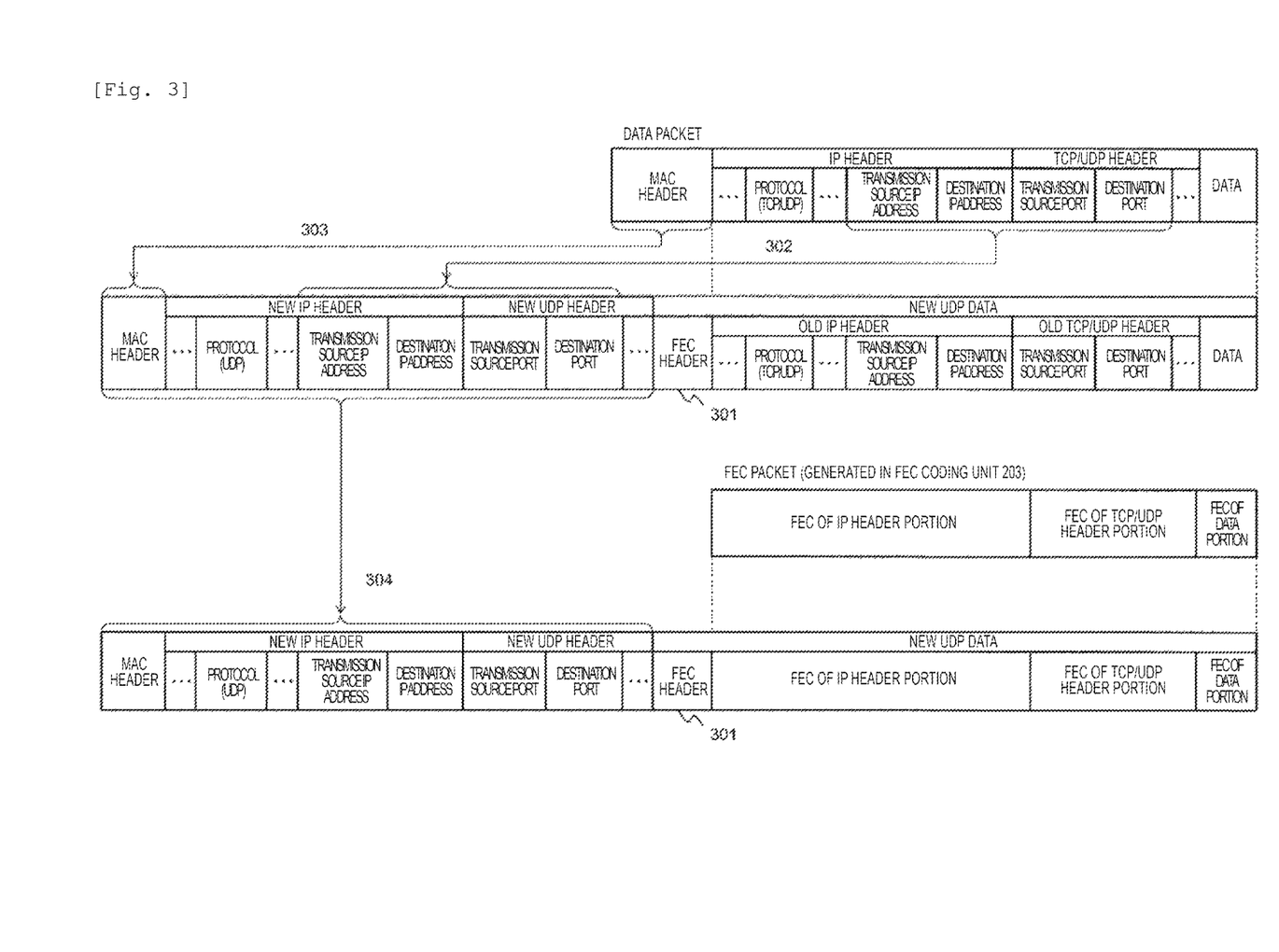
FIG. 3 is a diagram illustrating an example of transmission-side header processing according to the first embodiment of the present invention.

FIG. 3 illustrates an example of the header processing of the transmission-side FEC header processing unit 204. Firstly, regarding a data packet, because a data packet received by the transmission-side FEC header processing unit 204 may include plural types of protocols, the transmission header processing unit 204 causes an incoming data packet to be included in a new UDP/IP header, and causes the old data packet to be encapsulated as a data portion of a new UDP packet. At this time, a protocol portion of the new IP header corresponds to the UDP, and a transmission source IP address and a destination IP address of the IP header and a transmission source port and a destination port of the UDP header are generated by copying information of the old data packet (302).

In a case where the communication device 101 operates as a bridge, information of a MAC header is also copied (303). Further, an FEC header in which details of FEC coding are described is assigned to the leading of the new UDP data portion.

Regarding the FEC packet generated by the FEC coding unit 203, header information described in the right-previous data packet itself is copied and used (304). At this time, an identifier of the IP header is appropriately incremented. In a case where packet fragmentation is performed on the IP header, IP header information similar to the first half portion of the fragmented packet is copied to the second half packet, and an occurrence of fragmentation is described in the IP header as a flag of the IP header.

[FEC Header 301]

Figure 4:
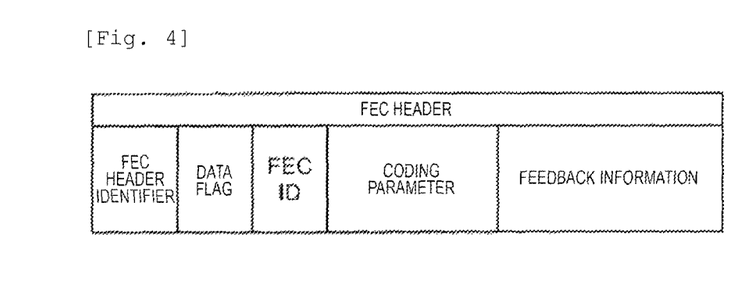
FIG. 4 is a diagram illustrating a configuration example of an FEC header according to the first embodiment of the present invention.

FIG. 4 illustrates a configuration example of the FEC header 301. A header identifier is used for recognizing that the packet is a coded packet. A data flag is used for recognizing whether data subsequent to the FEC header is a data packet or an FEC packet. An FEC ID has a value incremented whenever FEC is computed in the FEC coding unit 203. The coding parameter stores a parameter used when the FEC coding unit 203 performs coding processing. All pieces of information required in decoding have a need for being described in the FEC header 301, as the coding parameter. Feedback data generated based online quality information which has been acquired by the reception unit is described in the feedback information. For example, a redundancy control instruction in that redundancy is increased by 0.2 or is decreased by 0.1 or information such as the frequency of the occurrence of packet loss or burst loss may be directly described. Information of the length of an FEC header is described in the FEC header, and thus the length of the FEC header may vary.

[FEC Decoding Unit 209]

The FEC decoding unit 209 restores loss of a packet based on information of the coding parameter, which is described in the FEC header 301. The FEC decoding unit 209 has a certain buffer time T. Regarding a lost packet, the FEC decoding unit 209 restores a packet allowed to be restored, during the buffer time T, and transmits the restored packet to the reception-side FEC header processing unit 212. A packet of which restoration is not possible even though the buffer time elapses is handled as packet loss. Here, T has a certain value which has been preset. A user of the device can appropriately change T in accordance with a status of the line. In a case where a packet having the previous FEC ID is received after the buffer time T elapses, the received packet is discarded. According to another method, in a case where a packet having the previous FEC ID is received after the buffer time T elapses, in a case where the packet is restored by the FEC decoding unit 209, the restored packet may be discarded. In a case where the packet has not been restored, the packet may be delivered to the reception-side FEC header processing unit 212.

[Line Quality Measurement Unit 210]

The line quality measurement unit 210 measures the number of losses of packets which have been input to the FEC decoding unit 209 and are not restored yet, the number of losses after restoration, the frequency of the occurrence of burst loss, a packet loss rate, a burst loss time, and the like, and delivers the measured values to the feedback data generation unit 211, every time a certain preset time Tc elapses, or every time the predetermined number Nc of packets are received.

[Feedback Data Generation Unit 211]

Figure 6:
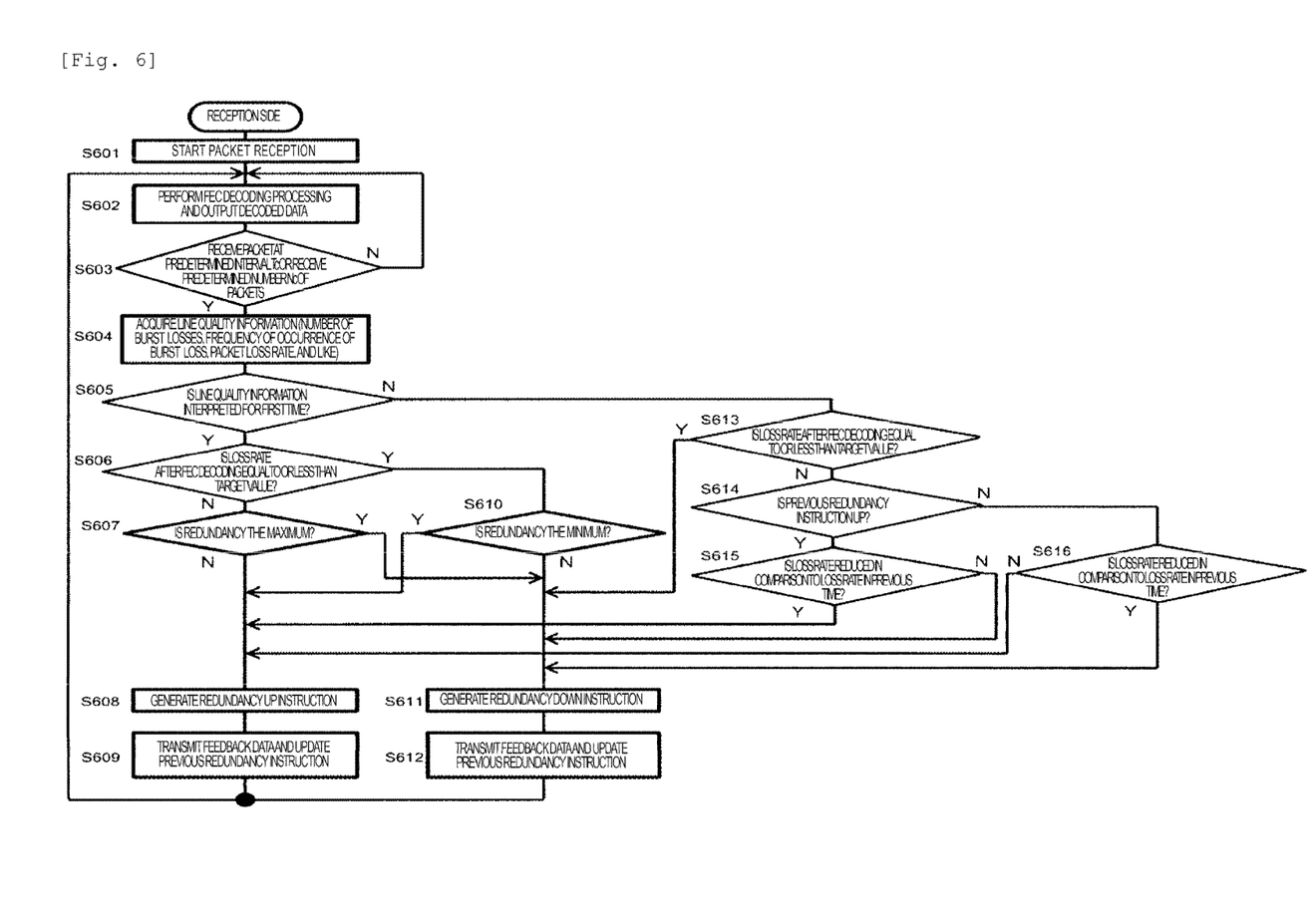
FIG. 6 is a diagram illustrating an operation flow of a feedback data generation unit according to the first embodiment of the present invention.

FIG. 6 illustrates a flow of feedback data generation. S601 is a state where reception of a packet in the reception unit is started. In S602, the decoding processing is performed by the FEC decoding unit 209. At this time, every time a certain preset time Tc elapses, or every time the predetermined number Nc of packets are received, the line quality information measurement unit 210 transmits interpreted line quality information to the feedback data generation unit 211 (S603-604). In a case where the line quality information is received for the first time, and when the line quality information has a value less than a predetermined target value (for example, the packet loss rate is equal to or more than a threshold value), and the ratio of the amount of the current error correction code packet to the amount of an input packet is set as k ($m \le k \le n$, and k, m, and n are real numbers of 0 or more), in a case of m<k, the feedback data generation unit 211 generates a feedback instruction to decrease the redundancy more (k is set to be close to m) (S605 (Y)-S606 (Y)-S610 (N)-S611-S612).

In S610, in a case where the redundancy is already the minimum (m=k), the feedback data generation unit 211 generates a feedback instruction to increase the redundancy (k is set to be close to n) (S610 (Y)-S608-S609). In a case where the line quality information is received for the first time, and the packet loss rate is more than the target value, if the redundancy is not the maximum (k=n), the feedback data generation unit 211 generates a feedback instruction to increase the redundancy (k is set to be close to n) (S605 (Y)-S606 (N)-S607 (N)-S608-S609). In S607, in a case where the redundancy is already the maximum, the feedback data generation unit 211 generates a feedback instruction to decrease the redundancy (k is set to be close to m) (S607 (Y)-S611-S612).

Figure 7:
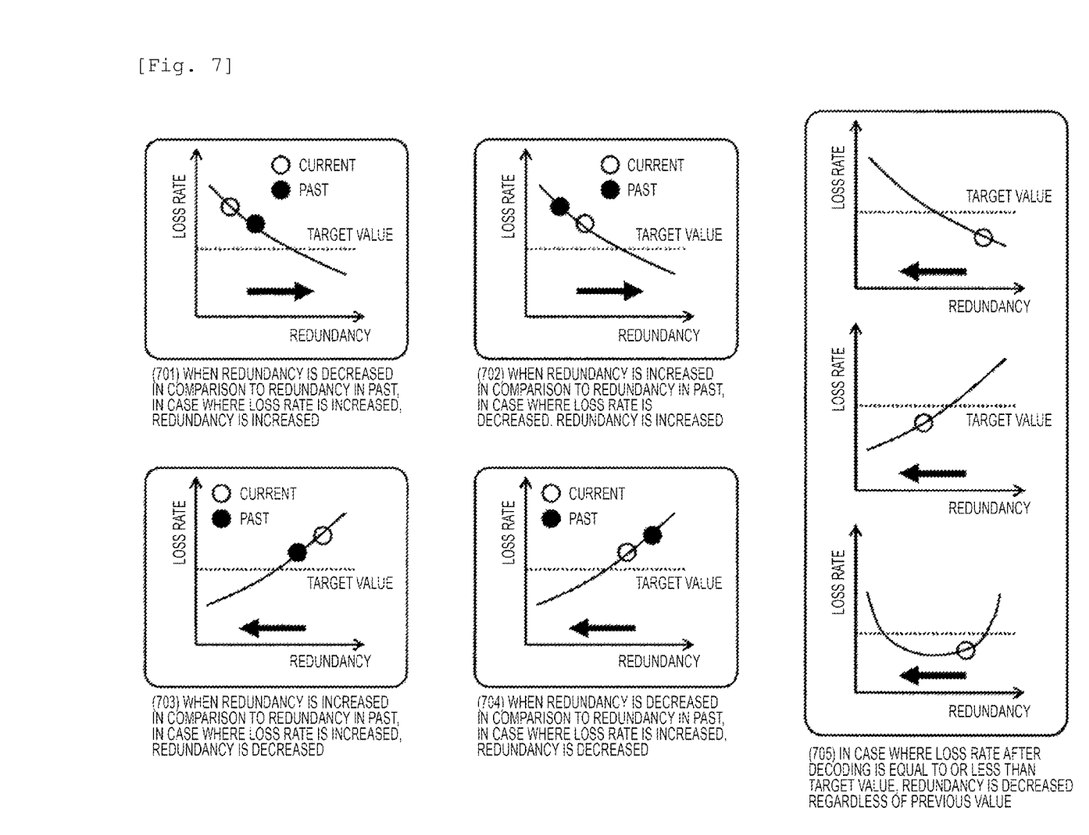
FIG. 7 is a diagram illustrating a state of the feedback data generation unit according to the first embodiment of the present invention.

In a case where the line quality information is acquired for the second and subsequent times, and in a case where the packet loss rate after restoration is less than the predetermined target value, the feedback data generation unit 211 may output an instruction to further decrease the redundancy, to the transmission-side FEC header processing unit 204 (S613 (Y)-S611-S612). FIG. 7 illustrates a diagram in which a relationship between the redundancy and the packet loss rate is classified into multiple cases. As illustrated in FIG. 7 (705), in a case where the packet loss rate after restoration is less than the target value, in order to reduce the load of the network, the redundancy can be decreased further in any case.

In a case where the line quality information is acquired for the second and subsequent times, and in a case where the packet loss rate after restoration is more than the target value, the feedback data generation unit 211 compares the previous redundancy change instruction and the previous line quality information to new line quality information which is newly calculated, and generates a new redundancy change instruction. For example, in a case where the previous redundancy change instruction is an instruction to increase the redundancy, and the packet loss rate is reduced in comparison to that in the previous time (S614 (Y)-S615 (Y)), this case corresponds to FIG. 7 (702), and the packet loss rate may be decreased by further increasing the redundancy. Thus, the feedback data generation unit 211 generates a feedback instruction for instructing the transmission-side FEC header processing unit 204 to further increase the redundancy (S608-S609). In a case where the previous instruction indicates an increase of the redundancy, and the loss rate is increased in comparison to that in the previous time (S614 (Y)-S615 (N)), this case corresponds to FIG. 7 (703), and there is an expectation that the packet loss rate is decreased by decreasing the redundancy. Thus, the feedback data generation unit 211 generates a feedback instruction to decrease the redundancy (S611-612).

In a case where the previous instruction indicates a decrease of the redundancy, and the packet loss rate is increased in comparison to that in the previous time (S614 (N)-S616 (N)), this case corresponds to the state of FIG. 7 (701), and there is an expectation that the redundancy is increased, but the packet loss rate is decreased. Thus, the feedback data generation unit 211 instructs the transmission-side FEC header processing unit 204 to increase the redundancy (S608-S609). In a case where the previous instruction indicates a decrease of the redundancy, and the packet loss rate is reduced in comparison to that in the previous time (S614 (N)-S616 (Y)), this case corresponds to FIG. 7 (704), and there is an expectation that the packet loss rate is decreased by decreasing the redundancy. Thus, the feedback data generation unit 211 generates an instruction to decrease the redundancy (S611-612).

In an operation example, an operation based on the line quality information and the packet loss rate as the target value is described. However, instead of the packet loss rate, a frequency of an occurrence of burst loss in which packet loss continuously occurs, the number of packets subjected to burst loss, or the like may be used as the criterion. In S606 and S613, when comparison to the target value is performed, the total value of pieces of line quality information of plural times, and the target value may be compared to each other.

[Reception-Side FEC Header Processing Unit 212]

Figure 5:
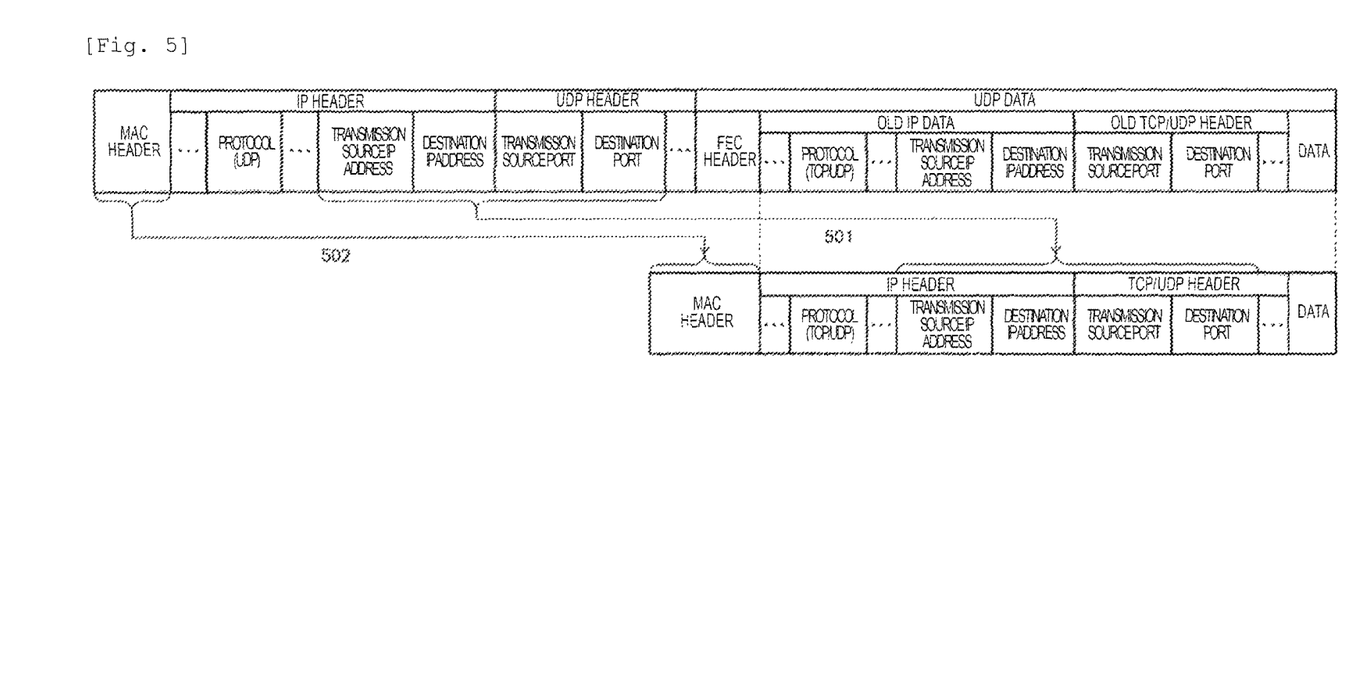
FIG. 5 is a diagram illustrating an example of reception-side header processing according to the first embodiment of the present invention.

FIG. 5 illustrates an example of the header processing in the reception-side FEC header processing unit 212. The received packet has a structure in which the original data packet is encapsulated in the UDP/IP header. Thus, the reception-side FEC header processing unit 212 extracts an old data packet portion from a data portion of an UDP packet. In a case where network address translation (NAT) is performed in the GW on the transmission side or on the reception side, a transmission source IP address, a destination IP address, and a transmission source port number in the reception packet are converted. Thus, the reception-side FEC header processing unit 212 overwrites the above pieces of information in the extracted old data packet (501). The reception-side FEC header processing unit 212 generates a copy of the MAC header (502). Thus, a packet corresponding to IP masquerading or port forwarding may be transmitted. After the above header operation is performed, the reception-side FEC header processing unit 212 transmits a data packet to the reception packet output unit 214. In a case where feedback data is described in an FEC header 401, the information is transmitted to the feedback data acquisition unit 213.

[Feedback Data Acquisition Unit 213]

The feedback data acquisition unit 213 acquires feedback data in the FEC header 401 by the reception-side FEC header processing unit 212. The feedback data corresponds to an instruction to change the redundancy, and the feedback data acquisition unit 213 delivers the acquired redundancy change instruction to the FEC coding unit 203.

Example 2

Figure 8:
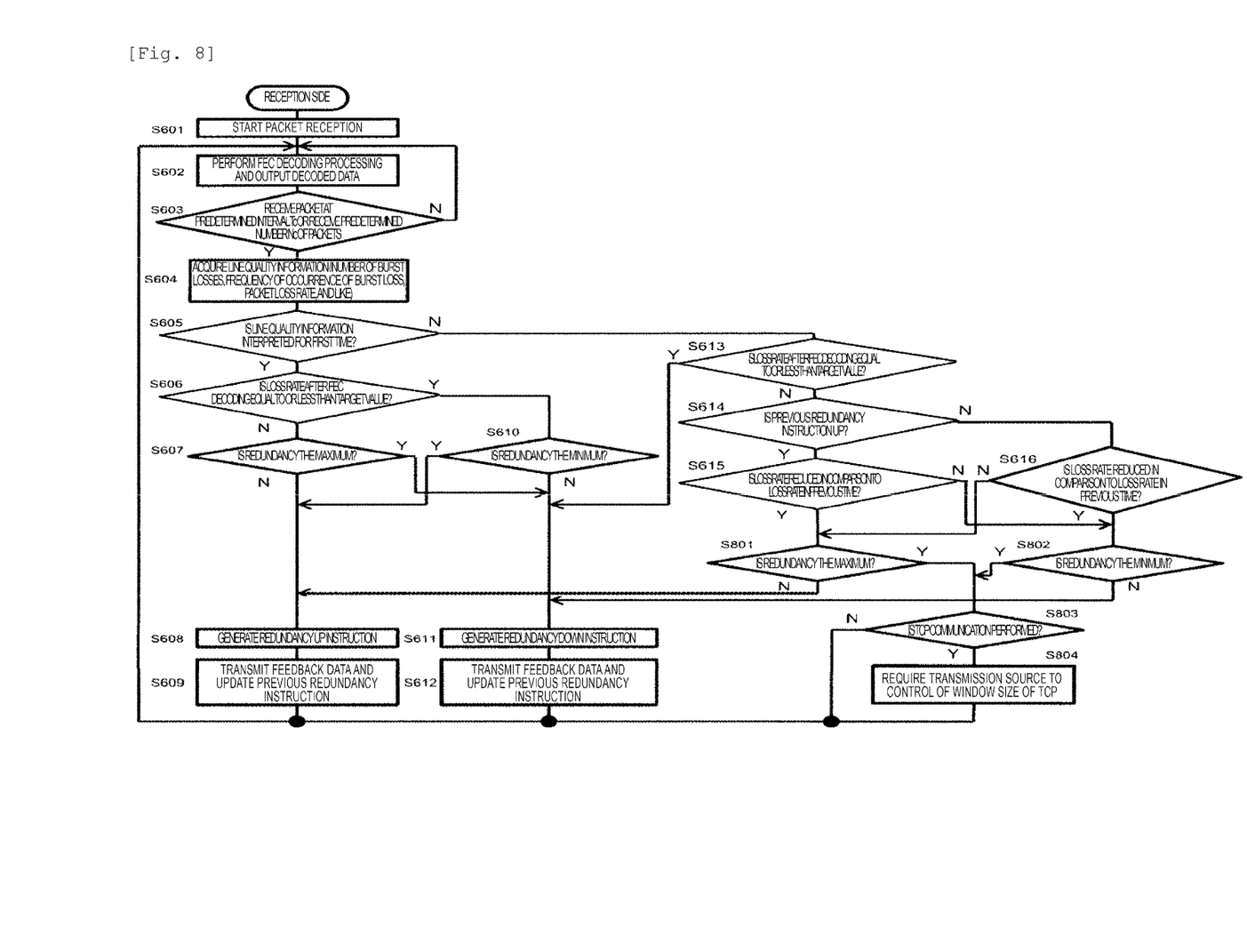
FIG. 8 is a diagram illustrating an operation flow of a feedback data generation unit according to a second embodiment of the present invention.
Figure 9:
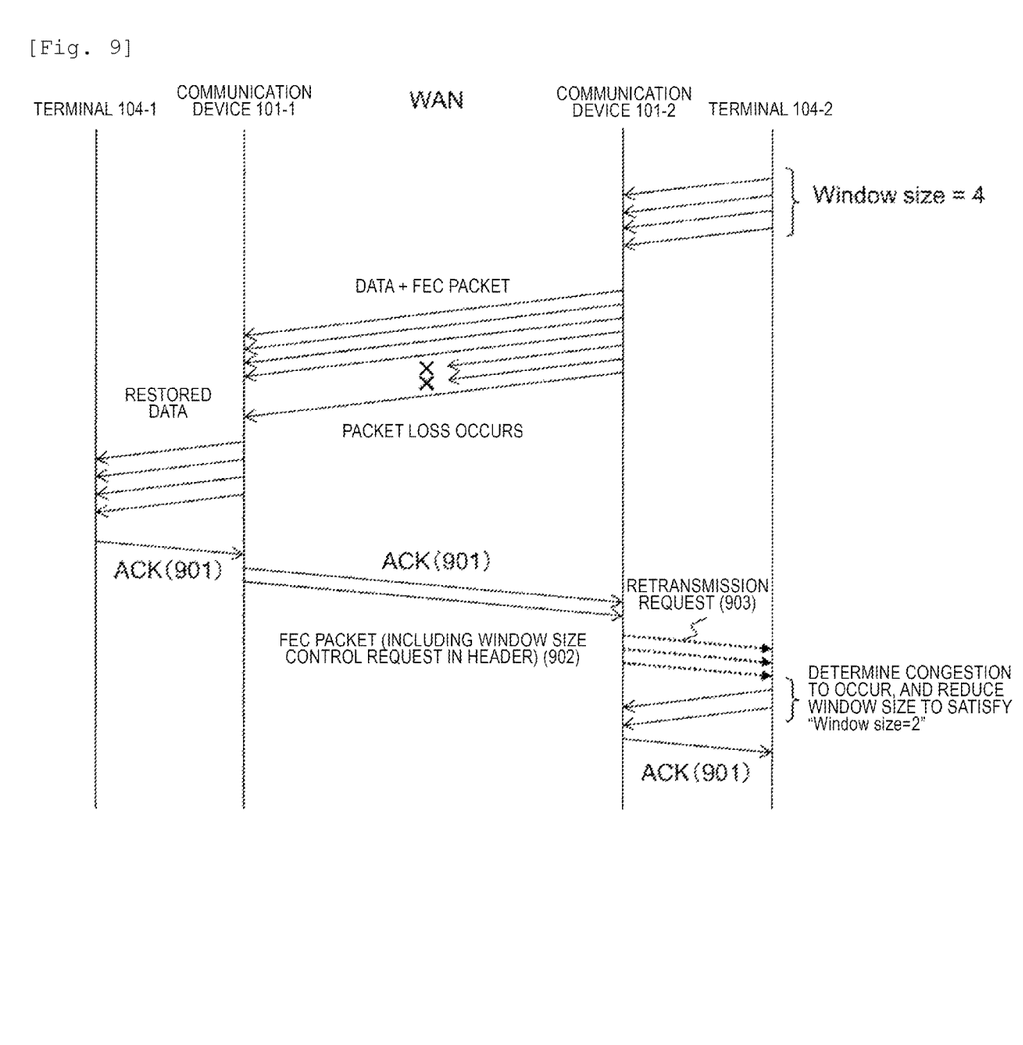
FIG. 9 is a diagram illustrating a flow of TCP communication according to the second embodiment of the present invention.

In Example 2, the feedback data generation unit 211 operates in the flow in FIG. 8. This is obtained by adding the state of S801-S804 to the flow of FIG. 6 in Example 1. When the loss rate after restoration is more than the target value, in a case where the redundancy is not increased any more in a state where the loss rate is decreased by increasing the redundancy (S614 (Y)-S615 (Y)-S801 (Y)) or in a case where the redundancy is not decreased any more in a state where the loss rate is decreased by decreasing the redundancy (S614 (N)-S616 (Y)-S802 (Y)), in a case where the TCP protocol is used as the transmission packet input 201 which is input to the communication device 101, a data transmission band may exceed an allowable amount. Thus, the transmission side can be notified of a request for reducing a window size of the TCP (S803-804). FIG. 9 illustrates an embodiment for controlling the window size of the TCP in S804. For example, in a case where data communication from the terminal 104-2 to the terminal 104-1 is performed with the TCP, the window size is set to correspond to four packets, in the terminal 104-2. At this time, four packets are continuously sent to the communication device 102-2 from the terminal 104-2. The communication device 101-2 adds FEC packets to the four input packets, and outputs the packets to the WAN side.

The communication device 101-1 receives data from the WAN side, and performs decoding processing. The communication device 101-1 delivers the decoded data to the terminal 104-1. The terminal 104-1 transmits ACK 901 as a response to the received data. However, at this time, in a case where the communication device 101-1 is in the state of S801 (Y) or S802-Y, a window-size control request of the TCP may be inserted into a feedback data portion of the FEC header 301 in the ACK 901, an FEC packet for the ACK 901, or both thereof. The terminal 104-1 may notify the communication device 101-2 of a result of the insertion.

The communication device 101-2 which receives the window-size control request and the ACK 901 postpones delivery of the ACK 901, and delivers a retransmission request 903 to the terminal 104-2. This uses the FastRetransmission function of the TCP, and ACK having a sequence number which is smaller than that of the ACK 901 is delivered continuously three times. The terminal 104-2 which received the retransmission request determines that congestion occurs, retransmits data, and decreases the window size. In the example of FIG. 9, an example in which the window size when the congestion occurs is reduced to be the half is illustrated. Here, the communication device 101-2 receives the ACK 901, and thus is in a state of recognizing that receiving packets having a sequence number up to a sequence number ahead of the sequence number of the ACK 901 is completed. Thus, it is possible to immediately transmit the ACK 901 as a response to retransmission of data from the terminal 104-2. Thus, it is possible to suppress delay by retransmission, to the minimum, and to control the window size of the TCP on the terminal 104 from the communication device 101.

Example 3

Figure 10:
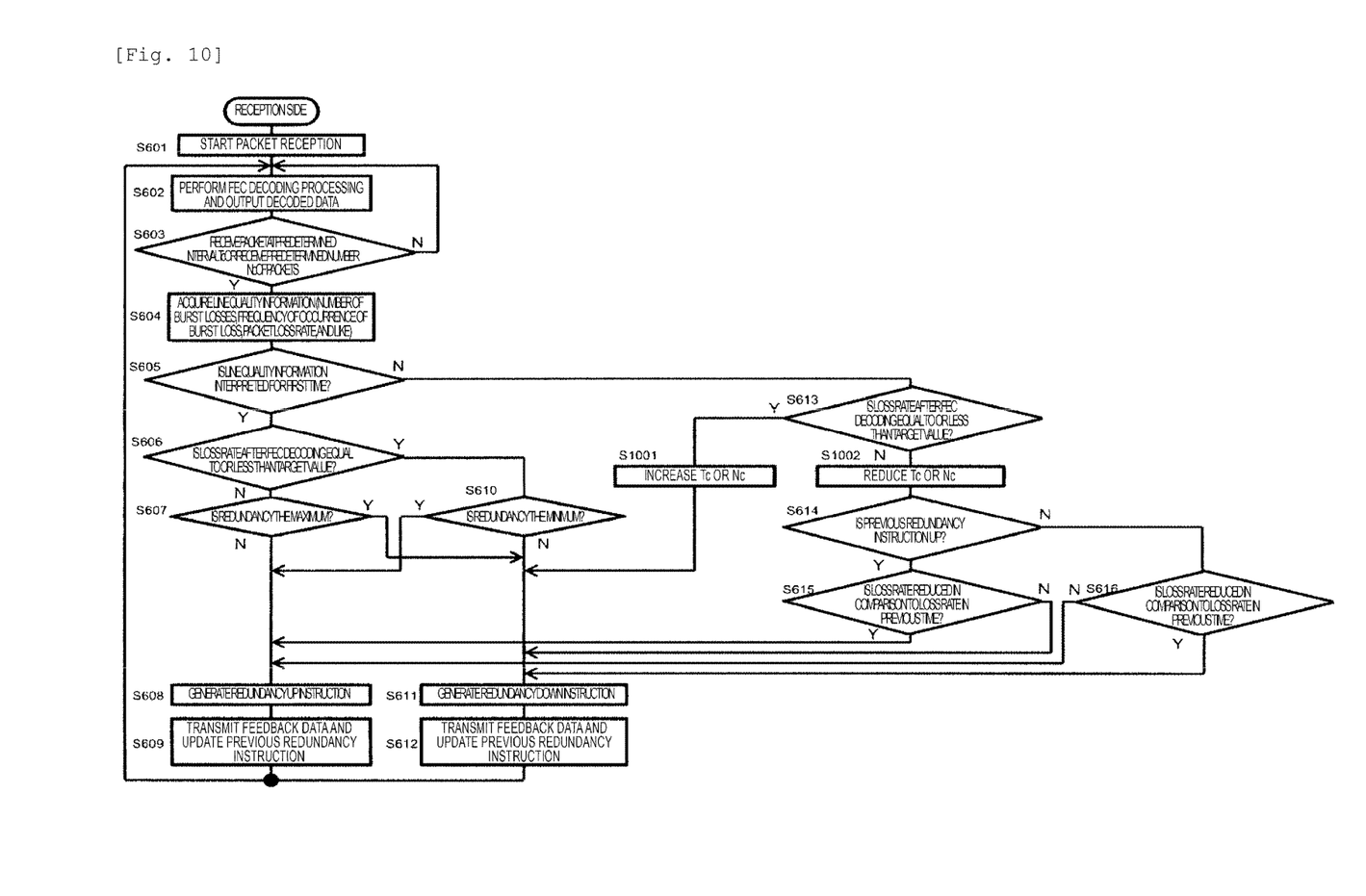
FIG. 10 is a diagram illustrating another operation flow of the feedback data generation unit according to the second embodiment of the present invention.

In Example 3, the flow in FIG. 10 will be described as the operation of the feedback data generation unit 211. This is obtained by adding the states of S1001 and S1002 to the flow of FIG. 6 in Example 1. In a case where the packet loss rate is equal to or less than the target value, it can be determined that line quality is good, and Tc which is an acquisition period of line quality information or Nc which is a period by the number of packets may be set to be larger. In a case where the packet loss rate does not satisfy the target value, it can be determined that the line quality is deteriorated, and a transmission period of feedback data may be reduced. As another method, in a case where the packet loss rate does not satisfy the target value, an operation so as to bring Tc and Nc which are the transmission period of feedback data back to predetermined initial values may be performed. Thus, it is possible to reduce the frequency of transmitting feedback data, to suppress an occurrence of a situation in which the redundancy is frequently changed, and to hold a state where communication quality is stable for a long term.

[Note]

In the above examples, a portion of the configuration of each of the examples may be added to the configuration of another example, or may be substituted. A portion or the entirety of the configuration, functions, processing units, and processing means may be realized by, for example, hardware which is designed by using an integrated circuit. A processor may interpret and execute a program for realizing the functions, and thus the above configuration, the functions, and the like may be realized in a form of software.

The communication method or the communication device and system according to the present invention may be provided by a communication program for causing a computer to perform procedures, a computer-readable storing medium in which the communication program is recorded, a program product which can be loaded on an internal memory of a computer, which includes the communication program, a computer such as a server, which includes the program, and the like.

REFERENCE SIGNS LIST

101 COMMUNICATION DEVICE
102 TRANSMISSION UNIT
103 RECEPTION UNIT
104 TERMINAL
105 GW(GATEWAY)
106 COMMUNICATION LINE (WIRED, WIRELESS)
201 PACKET INPUT TO TRANSMISSION UNIT 102
202 TRANSMISSION PACKET TYPE DETERMINATION UNIT
203 FEC CODING UNIT
204 TRANSMISSION-SIDE FEC HEADER PROCESSING UNIT
205 PACKET TRANSMISSION UNIT
206 PACKET OUTPUT FROM TRANSMISSION UNIT 102
207 PACKET INPUT TO RECEPTION UNIT 103
208 RECEPTION PACKET TYPE DETERMINATION UNIT
209 FEC DECODING UNIT
210 LINE QUALITY MEASUREMENT UNIT

211 FEEDBACK DATA GENERATION UNIT
212 RECEPTION-SIDE FEC HEADER PROCESSING UNIT
213 FEEDBACK DATA EXTRACTION UNIT
214 PACKET OUTPUT UNIT
215 PACKET OUTPUT FROM RECEPTION UNIT 103
301 FEC HEADER
901 ACK PACKET IN TCP COMMUNICATION

The invention claimed is:

1. A communication device, comprising:
a transmission unit; and
a reception unit,
wherein the reception unit is configured to include an error correction decoding unit, a line quality measurement unit, a feedback data generation unit, a reception-side header processing unit, and a feedback data extraction unit,
the error correction decoding unit restores missing of a reception packet, based on information which is included in an error correction header of a received packet and has redundancy settings,
the line quality measurement unit measures line quality information which has a packet loss rate, the number of packets which are continuously lost, and a frequency of packet loss continuously occurring, based on the received packet and a packet obtained after restoration is performed by the error correction decoding unit,
the feedback data generation unit generates new feedback data at a time point t2, based on line quality information which is extracted at a time point t1 in a line quality measurement unit, line quality information measured at the time point t2 which is a time point after the time point t1, and information of feedback data generated at the time point t1,
the reception-side header processing unit extracts a data portion of each packet output from the error correction decoding unit and transmits information included in the error correction header to the feedback data extraction unit,
the feedback data extraction unit extracts feedback data from information of the error correction header,
the transmission unit is configured to include the error correction coding unit and a transmission-side header processing unit,
the error correction coding unit allows a ratio k of a generated correction code packet to an input packet to be changed in a range of m to n, in accordance with a value of the feedback data extracted by the feedback data extraction unit m and n are predetermined real numbers of 0 or more, and $m \leq k \leq n$ is satisfied, and
the transmission-side header processing unit assigns a coding parameter of a packet coded by the error correction coding unit and feedback data generated by the feedback data generation unit, to a packet which is to be transmitted as an error correction header,
wherein: the feedback data generation unit acquires the ratio k of the number of input packets and the number of error correction code packets, from the feedback data extraction unit,
in a case where line quality information is acquired from the line quality measurement unit for the first time, and the obtained communication quality is lower than a predetermined target value of communication quality, the feedback data generation unit generates feedback data so as to increase the ratio k of an error correction code amount in a case of $k<n$, and generates feedback data so as to decrease the ratio k of the error correction code amount in a case of $k=n$, and
in a case where the line quality information is acquired from the line quality measurement unit for the first time, and the obtained communication quality is higher than the predetermined target value of the communication quality, the feedback data generation unit generates feedback data so as to decrease the ratio k of the error correction code amount in a case of $m<k$, and generates feedback data so as to increase the ratio of k of the error correction code amount in a case of $m=k$.

2. The communication device according to claim 1,
wherein the line quality information measurement unit measures line quality information at a time Tc, or every time pieces Nc of packets are received,
the line quality information measurement unit increases the time Tc or the number Nc of packets, in a case where the line quality information is acquired for the second and subsequent times and the acquired line quality information indicates quality which is higher than the predetermined target value, and
the line quality measurement unit decreases the time Tc or the number Nc of packets, in a case where the line quality information is acquired for the second and subsequent times and the acquired line quality information indicates quality which is lower than the predetermined target value.

3. The communication device according to claim 1,
wherein the line quality measurement unit measures line quality information at a time Tc, or every time pieces Nc of packets are received,
the line quality information measurement unit increases the time Tc or the number Nc of packets, in a case where the line quality information is acquired for the second and subsequent times and the acquired line quality information indicates quality which is higher than the predetermined target value, and
the line quality information measurement unit initializes the time Tc or the number Nc of packets to be defined values, in a case where the line quality information is acquired for the second and subsequent times, and the acquired line quality information indicates quality which is lower than the predetermined target value.

4. The communication device according to claim 1,
wherein the packet loss rate, a frequency of an occurrence of burst loss in which the packet loss continuously occurs, or the number of packets subjected to burst loss is used as the line quality information from the line quality measurement unit and the predetermined target value of the line quality.

5. A communication device, comprising:
a transmission unit; and
a reception unit,
wherein the reception unit is configured to include an error correction decoding unit, a line quality measurement unit, a feedback data generation unit, a reception-side header processing unit, and a feedback data extraction unit,
the error correction decoding unit restores missing of a reception packet, based on information which is included in an error correction header of a received packet and has redundancy settings,
the line quality measurement unit measures line quality information which has a packet loss rate, the number of packets which are continuously lost, and a frequency of packet loss continuously occurring, based on the received packet and a packet obtained after restoration is performed by the error correction decoding unit, the feedback data generation unit generates new feedback data at a time point t2, based on line quality information which is extracted at a time point t1 in a line quality measurement unit, line quality information measured at the time point t2 which is a time point after the time point t1, and information of feedback data generated at the time point t1, the reception-side header processing unit extracts a data portion of each packet output from the error correction decoding unit and transmits information included in the error correction header to the feedback data extraction unit, the feedback data extraction unit extracts feedback data from information of the error correction header, the transmission unit is configured to include the error correction coding unit and a transmission-side header processing unit, the error correction coding unit allows a ratio k of a generated correction code packet to an input packet to be changed in a range of m to n, in accordance with a value of the feedback data extracted by the feedback data extraction unit m and n are predetermined real numbers of 0 or more, and m≤k≤n is satisfied, and the transmission-side header processing unit assigns a coding parameter of a packet coded by the error correction coding unit and feedback data generated by the feedback data generation unit, to a packet which is to be transmitted as an error correction header, wherein: in a case where line quality information is acquired from the line quality measurement unit for the second and subsequent times, and the obtained line quality information indicates quality which is lower than the predetermined target value, the feedback data generation unit generates feedback data so as to further increase the ratio k of the error correction code amount in a case where, because the previous feedback data causes the ratio k of the error correction code amount to be increased, the previous line quality information is compared to new acquired line quality information, and it is determined that line quality is improved, the feedback data generation unit generates feedback data so as to decrease the ratio k of the error correction code amount in a case where, because the previous feedback data causes the ratio k of the error correction code amount to be increased, the previous line quality information is compared to new acquired line quality information, and it is determined that the line quality is deteriorated, the feedback data generation unit generates feedback data so as to further decrease the ratio k of the error correction code amount in a case where, because the previous feedback data causes the ratio k of the error correction code amount to be decreased, the previous line quality information is compared to new acquired line quality information, and it is determined that the line quality is improved, and the feedback data generation unit generates feedback data so as to increase the ratio k of the error correction code amount in a case where, because the previous feedback data causes the ratio k of the error correction code amount to be decreased, the previous line quality information is compared to new acquired line quality information, and it is determined that the line quality is deteriorated.

6. The communication device according to claim 5, wherein in a case where, because the previous feedback data causes redundancy to be increased, the previous line quality information is compared to new acquired line quality information, and it is determined that the line quality is improved, and it is determined that it is not possible to more increase the ratio k of the error correction code amount when k=m, or in a case where, because the previous feedback data causes the ratio k of the error correction code amount to be decreased, the previous line quality information is compared to new acquired line quality information, and it is determined that the line quality is improved, and it is determined that it is not possible to more decrease the ratio k of the error correction code amount when m=k, in a case where communication which is input to the communication device and is not coded yet is a TCP protocol, the feedback data generation unit describes and transmits a certain flag in a portion of the error correction header, as feedback data assigned to an ACK packet or an error correction code packet which is calculated based on the ACK packet, and the communication device that receives the flag transmits a retransmission request instead of transmission of the ACK packet, and immediately transmits the ACK packet as a response to retransmitted data.

* * * * *